(12) United States Patent
Miyachi et al.

(10) Patent No.: US 9,185,245 B2
(45) Date of Patent: Nov. 10, 2015

(54) METHOD AND APPARATUS FOR REMOTELY CONTROLLING A CAMERA CONNECTED TO A MULTI-FUNCTION DEVICE

(75) Inventors: Christine Miyachi, Cambridge, MA (US); Elton Tarik Ray, Livonia, NY (US)

(73) Assignee: Xerox Corporation, Norwalk, CT (US)

( * ) Notice: Subject to any disclaimer, the term of this patent is extended or adjusted under 35 U.S.C. 154(b) by 533 days.

(21) Appl. No.: 13/556,776

(22) Filed: Jul. 24, 2012

(65) Prior Publication Data

US 2014/0028866 A1    Jan. 30, 2014

(51) Int. Cl.
*H04N 1/00* (2006.01)
*H04N 5/232* (2006.01)

(52) U.S. Cl.
CPC ....... *H04N 1/00244* (2013.01); *H04N 1/00347* (2013.01); *H04N 5/23206* (2013.01); *H04N 2201/0013* (2013.01); *H04N 2201/0044* (2013.01); *H04N 2201/0084* (2013.01); *H04N 2201/0094* (2013.01)

(58) Field of Classification Search
CPC .......... H04N 1/00244; H04N 1/00347; H04N 5/23206; H04N 2201/0044; H04N 2201/0084; H04N 2201/0094; H04N 2201/0013
See application file for complete search history.

(56) References Cited

U.S. PATENT DOCUMENTS

| | | | |
|---|---|---|---|
| 2002/0059431 A1* | 5/2002 | Terada | 709/227 |
| 2008/0144096 A1* | 6/2008 | Kawai | 358/1.15 |
| 2011/0058202 A1* | 3/2011 | St. Jacques et al. | 358/1.13 |
| 2011/0240736 A1* | 10/2011 | Miyachi et al. | 235/382 |
| 2013/0007289 A1* | 1/2013 | Seo et al. | 709/227 |
| 2013/0015946 A1* | 1/2013 | Lau et al. | 340/5.2 |

* cited by examiner

*Primary Examiner* — Twyler Haskins
*Assistant Examiner* — Angel L Garces-Rivera

(57) ABSTRACT

A method, non-transitory computer readable medium, and apparatus for remotely controlling a camera connected to a multi-function device are disclosed. For example, the method receives a request from a third party server to instruct the camera to take a photograph, sends a call to the camera to take the photograph, wherein the call is sent to the camera over a universal serial bus (USB) connection between the multi-function device and the camera, receives the photograph and transmits the photograph to the third party server.

12 Claims, 3 Drawing Sheets

METHOD AND APPARATUS FOR REMOTELY CONTROLLING A CAMERA CONNECTED TO A MULTI-FUNCTION DEVICE

The present disclosure relates generally to providing remote control of devices connected to a multi-function device and, more particularly, to a method and apparatus for remotely controlling a camera connected to a multi-function device via a universal serial bus connection.

BACKGROUND

Currently, to remotely control off the shelf external devices connected to a multi-function device requires a high level of customization and associated costs. For example, application programming interfaces (APIs) may be specifically written for specific types of external devices that work with specific multi-function devices that provided limited functionality. However, the APIs still do not provide complete remote control of the off the shelf external device connected to the multi-function device. In addition, the customer would be required to purchase the specific brand or type of external device that is programmed with the API to work with the specific multi-function device. As a result, the customers would be extremely limited to their choices of an external device and a multi-function device.

SUMMARY

According to aspects illustrated herein, there are provided a method, a non-transitory computer readable medium, and an apparatus for remotely controlling a camera connected to a multi-function device. One disclosed feature of the embodiments is a method that receives a request from a third party server to instruct the camera to take a photograph, sends a call to the camera to take the photograph, wherein the call is sent to the camera over a universal serial bus (USB) connection between the multi-function device and the camera, receives the photograph and transmits the photograph to the third party server.

Another disclosed feature of the embodiments is a non-transitory computer-readable medium having stored thereon a plurality of instructions, the plurality of instructions including instructions which, when executed by a processor, cause the processor to perform a method that receives a request from a third party server to instruct the camera to take a photograph, sends a call to the camera to take the photograph, wherein the call is sent to the camera over a universal serial bus (USB) connection between the multi-function device and the camera, receives the photograph and transmits the photograph to the third party server.

Another disclosed feature of the embodiments is an apparatus comprising a processor that is configured to receive a request from a third party server to instruct the camera to take a photograph, to send a call to the camera to take the photograph, wherein the call is sent to the camera over a universal serial bus (USB) connection between the multi-function device and the camera, to receive the photograph and to transmit the photograph to the third party server.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for remotely controlling a camera connected to a multi-function device. As discussed above, to remotely control an off the shelf external device, such as a camera, connected to a multi-function device requires a customized API that severely limits users' choices for the external device.

One embodiment of the present disclosure utilizes web service based calls between a third party server and a multi-function device to allow the third party server to control a camera connected to the multi-function device. As a result, the third party server may control when the camera takes photographs and when the photographs are sent back to the third party server for further processing.

Figure 1:
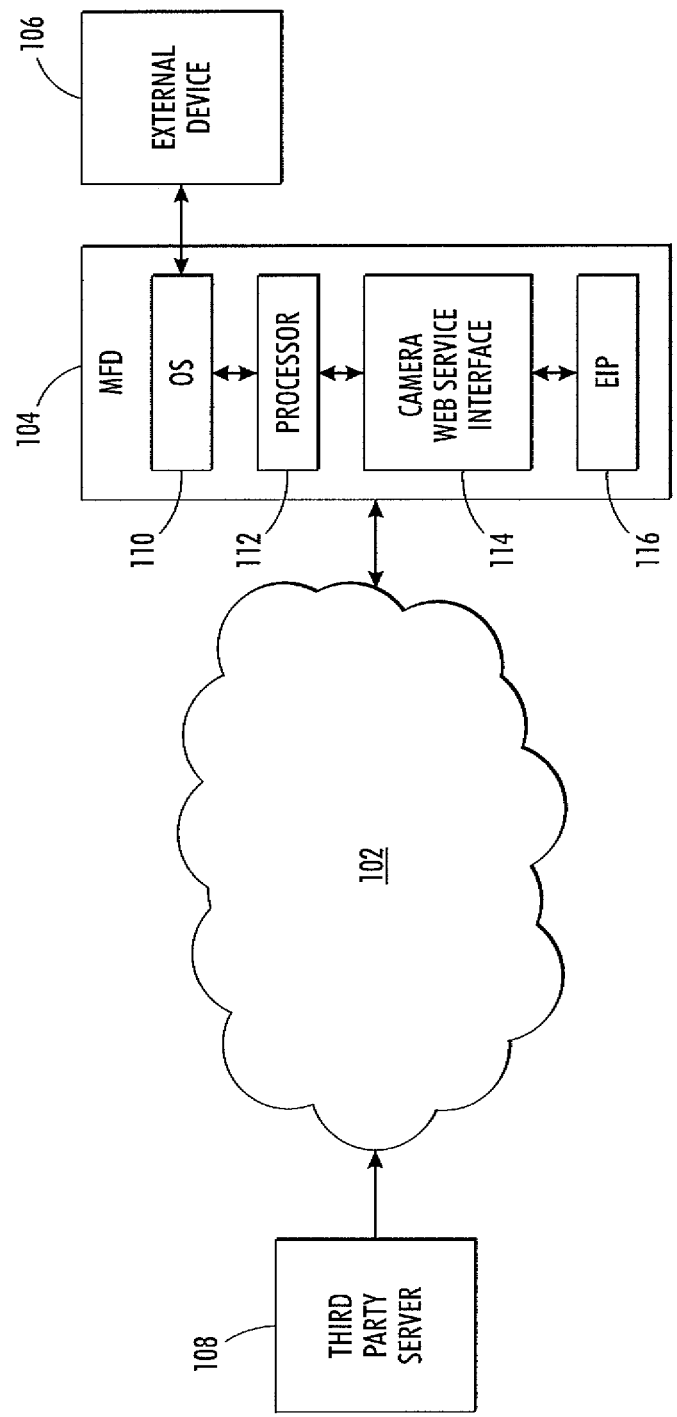
FIG. 1 illustrates one example of a communication network of the present disclosure.

To better understand the present disclosure, FIG. 1 illustrates an example of a communication network 100. In one embodiment, the communication network 100 includes a packet network such as an Internet Protocol (IP) network 102. The IP network 102 may be, for example, the Internet, a service provider network, an access network, a core network, a local area network, and the like.

In one embodiment, a multi-function device (MFD) 104 may be in communication with the IP network 102. In one embodiment, the MFD 104 may include general purpose computing capabilities similar to the general computing device described below and illustrated in FIG. 4. In one embodiment, the MFD 104 may include at least two different functions including but not limited to, for example, digital image processing capability, electronic communication capability (e.g., email transmission, electronic file transmission, and the like), scanning capability, faxing capability, copying capability, printing capability, interfacing capability with a user via a graphical user interface with or without a touch screen, one or more input and output devices, and the like.

In one embodiment, the MFD 104 may include an operating system (OS) 110, a processor 112, a camera web service interface 114 and an extensible interface platform (EIP) 116. In one embodiment, the camera web service interface 114 may be a client that is executed on the MFD 104. In another embodiment, the camera web service interface 114 may be executed by another computer or processor external to the MFD 104.

In one embodiment, an external device 106 may be in communication with the MFD 104. In one embodiment, the external device 106 may be a camera that is connected to the MFD 104 via a universal serial bus (USB) connection.

In one embodiment, the external device 106 may be an off the shelf device. In other words, the external device 106 is not necessarily manufactured with any specific application programming interfaces or made to only be compatible with a specific MFD. Rather, the external device 106 may be any external device that is available and sold at local retailers, for example.

In one embodiment, a third party server 108 may be in communication with the IP network 102. The third party server 108 may be operated by a third party that is remotely located from the MFD 104 and is attempting to remotely control the external device 106. For example, if the external device 106 is a camera, control may be defined as determining when to take a photograph with the camera, determining which object to take a photograph of, determining where to focus the camera, determining when and where to send a photograph, configuring the camera, and the like. Notably, logging into a server to use the camera (e.g., accessing a storage device of the camera to see pictures stored on the camera, etc.) would not be equivalent to controlling the operation of the camera to capture images.

In one embodiment, the third party server 108 may be configured to communicate with the MFD 104 via the EIP 116. The EIP 116 may be a type of web client that allows the third party server 108 to communicate with the MFD 104 using web service based calls. The web service based calls may include any type of web service based calls, such as for example, Web Service Description Language (WDSL), Simple Object Access Protocol (SOAP), and the like.

In one embodiment, the third party server 108 may configure the MFD 104 to communicate over an IP address and a port number specified by the third party server 108. This may help to ensure that communication between the third party server 108 and the camera web service interface 114 and/or the MFD 104 is secure.

In one embodiment, the configuration of the communication network 100 as illustrated in FIG. 1 may allow a user at the third party server 108 to remotely control the external device 106 connected to the MFD 104 via a USB connection. As will be discussed in further detail below, the user may then control the external device 106, for example in the case of a camera, determine when and how to take a photograph, when and how to send a photograph, how to configure the camera, and the like.

It should be noted that the communication network 100 has been simplified for clarity. For example, the communication network 100 may include other network elements such as border elements, routers, switches, policy servers, security devices, firewalls, a content distribution network (CDN) and the like. In addition, the communication network 100 may include additional networks between the endpoint devices and the IP network 102 such as different access networks (e.g., a wired access network, a cable network, a wireless network, a cellular network, a Wi-Fi network, and the like) to reach the IP network 102.

Figure 2:
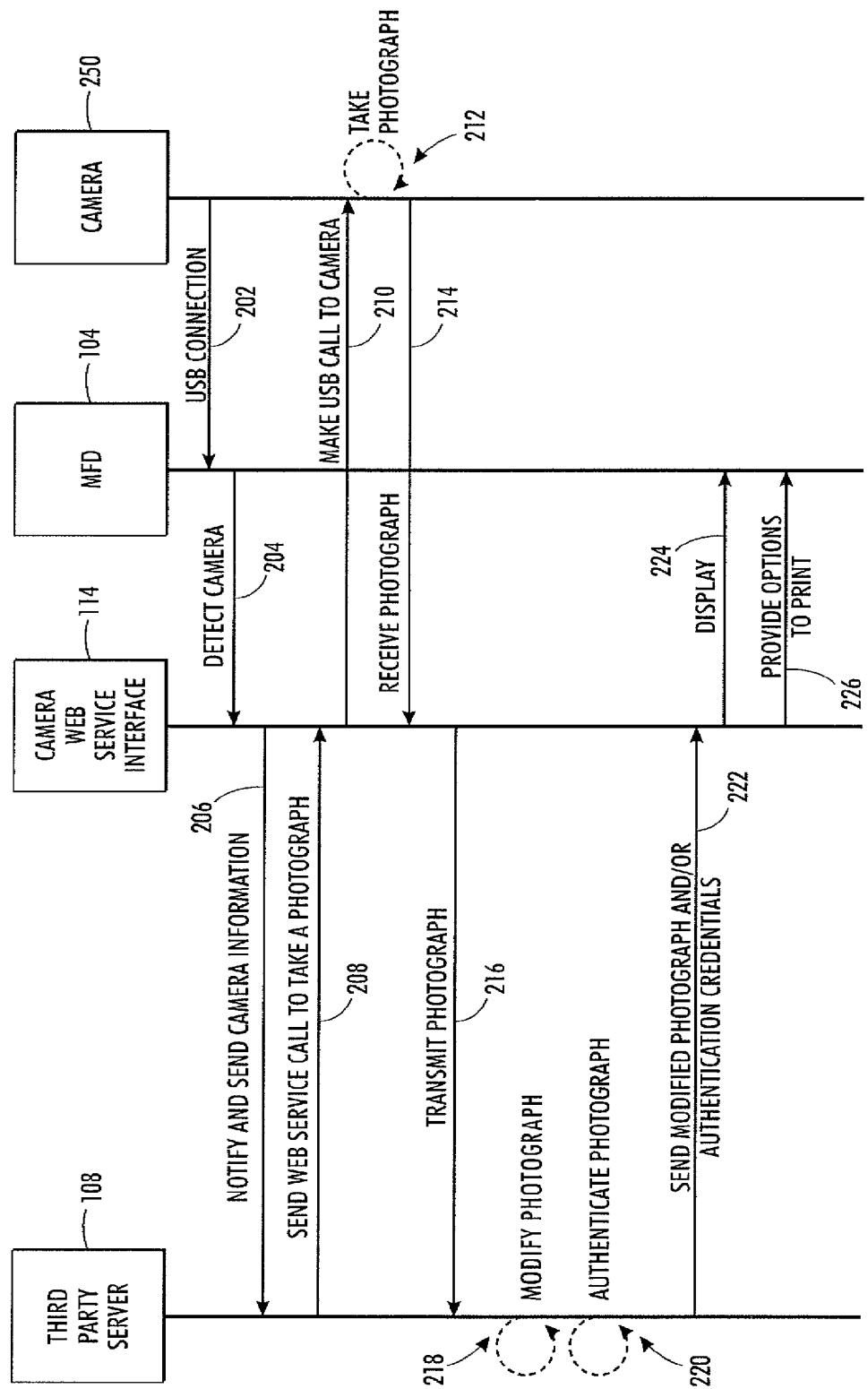
FIG. 2 illustrates an example of a system flow diagram of one embodiment of a method for remotely controlling a camera connected to a multi-function device.

FIG. 2 illustrates an example of a system flow diagram of one embodiment of a method 200 for remotely controlling a camera 250 connected to the MFD 104 via a USB connection. The method 200 may be illustrated, in one example, as interaction between the third party server 108, the camera web service interface 114, the MFD 104 and the camera 250. In one embodiment, the third party server 108 may communicate with the MFD 104 via the EIP 116. As noted above, the camera web service interface 114 may be on the MFD 104 or external to the MFD 104, e.g., on another remotely located computer.

The method 200 begins at step 202. At step 202, a USB connection is made between the MFD 104 and the camera 250. As noted above, the camera 250 may be any off the shelf camera. At step 204, the camera web service interface 114 detects that the camera 250 is connected to the MFD 104 and is activated, e.g., powered on.

At step 206, the third party server 108 is notified that the camera 250 is activated and connected to the MFD 104. In one embodiment, communication between the third party server 108 and the camera web service interface 114 may be implemented via an IP address and a port number specified by the third party server 108 to enable secure communications.

In addition, information about the camera 250 may be sent. In one embodiment, the information may include a manufacturer of the camera, a type of camera, all of the capabilities of the camera, as well as any other pertinent information related to the camera.

At step 208, the third party server 108 may send a web service call to take a photograph. As noted above, the web service call may be based upon any protocol suitable for web service calls, such as for example, WDSL, SOAP, and the like.

At step 210, the camera web service interface 114 may receive the web service call from the third party server 108 and send a USB call to the camera 250. In one embodiment, the camera web service interface 114 may send a call to the operating system (e.g., OS 110 in FIG. 1) via the processor 112 of the MFD 104, which in turns sends the USB call to the camera 250.

At step 212, the camera 250 may take a photograph. At step 214, the camera web service interface 114 may receive the photograph. For example, the third party server 108 may instruct the camera 250 to transmit the photograph back immediately after the photograph is taken. In another embodiment, the EIP 116 may instruct the camera 250 to store the photograph on a computer readable storage medium (e.g., internal memory of the camera 250 or an external memory). In another embodiment, the EIP 116 may instruct the camera 250 to send the photograph to the MFD 104 to have it printed or copied by the MFD 104.

Notably, the camera 250 is controlled by the third party server 108 located remotely from the camera 250 and the MFD 104. In other words, the third party server 108 is not simply accessing the camera 250 to look at files. Rather, the third party server 108 is controlling the timing and execution of the camera's image capturing functionality, e.g., when and how to take a photograph, when and where to send the photograph that is taken, and the like.

At step 216, the camera web service interface 114 may transmit the photograph to the third party server 108. In one embodiment, the photograph may be sent using a message transmission optimization mechanism (MTOM).

At this point the third party server 108 may perform one of a plurality of optional processing steps depending on the application. In one embodiment, the third party server 108 may modify the photograph at step 218. For example, the third party server 108 may modify the photograph to change the color of the photograph, change a size of the photograph or add the photograph to a document, such as for example, a passport application, security identification card, and the like.

In one embodiment, the third party server 108 may use the photograph for authentication at step 220. For example, the third party server 108 may compare the photograph to pre-existing photographs stored in a database. Each one of the pre-existing photographs may be associated with a security clearance or other authentication credentials. The photograph may be taken to determine if a user is authenticated to use the MFD 104, access another device, access a particular area, and the like. If the photograph matches one of the pre-existing photographs, the user may be granted the associated security clearance or authentication credentials.

At step 222, the third party server 108 may send the modified photograph and/or the authentication credentials to the camera web service interface 114. At step 224, the MFD 104 may display the modified photograph and/or authentication credentials to a user, for example, via a graphical user interface of the MFD 104.

At step 226, the MFD 104 may provide options to the user. For example, the options may include to print the modified photograph and/or authentication credentials, to make copies of the modified photograph and/or authentication credentials, to fax or to email the modified photograph and/or authentication credentials, to store the modified photograph and/or authentication credentials to another device, and the like.

Figure 3:
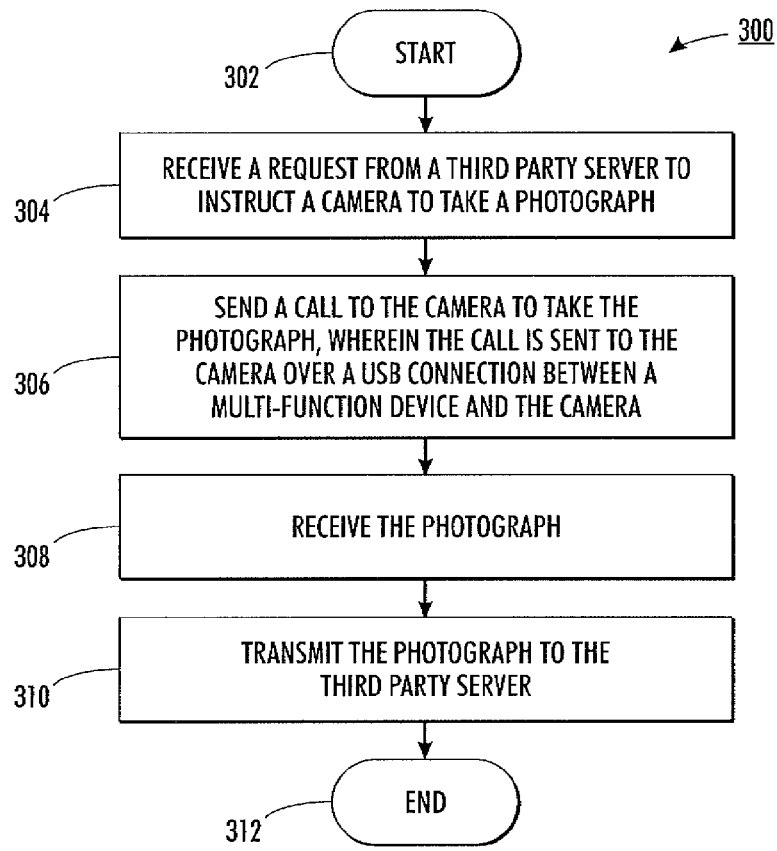
FIG. 3 illustrates one example of a flowchart of one embodiment of a method for remotely controlling a camera connected to a multi-function device.
Figure 4:
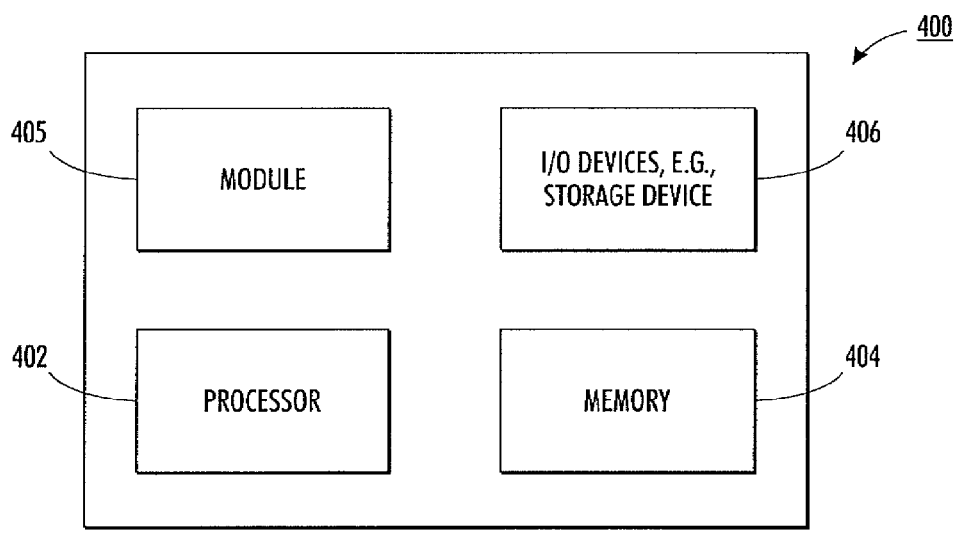
FIG. 4 illustrates a high-level block diagram of a general-purpose computer suitable for use in performing the functions described herein.

FIG. 3 illustrates a flowchart of a method 300 for transmitting an object from a scanned document. In one embodiment, the method 300 may be performed by the multi-function device 104 or a general purpose computer as illustrated in FIG. 4 and discussed below.

The method 300 begins at step 302. At step 304, the method 300 receives a request from a third party server to instruct a camera to take a photograph. For example, the request may be from the third party server over a secure communications IP address and port number. In one embodiment, the request may be in the form of a web service based call.

At step 306, the method 300 sends a call to the camera to take the photograph, wherein the call is sent to the camera over a USB connection between a multi-function device and the camera. In one embodiment, a camera web service interface may send a call to the multi-function device's operating system to send the call over the USB connection to the camera in response to receiving the request from the third party server.

At step 308, the method 300 receives the photograph. For example, after the camera takes a photograph as instructed, the camera may send the photograph back to the multi-function device via the USB connection.

At step 310, the method 300 transmits the photograph to the third party server. In one embodiment, the photograph may be transmitted using a message transmission optimization mechanism (MTOM). Once the third party server receives the photograph, the third party server uses the photograph for various applications such as for authentication or modifying the photograph, as discussed above. The method ends at step 312.

It should be noted that although not explicitly specified, one or more steps of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 2 and 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for remotely controlling a camera connected to a multi-function device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for remotely controlling a camera connected to a multi-function device can be loaded into memory 404 and executed by processor 402 to implement the functions as discussed above. As such, the present method 405 for remotely controlling a camera connected to a multi-function device (including associated data structures) of the present disclosure can be stored on a non-transitory (e.g., tangible or physical) computer readable storage medium, e.g., RAM memory, magnetic or optical drive or diskette and the like. For example, the hardware processor 402 can be programmed or configured with instructions (e.g., computer readable instructions) to perform the steps of methods 200 and 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for remotely controlling a camera connected to a multi-function device (MFD), the method comprising:
receiving, via the MFD, a request from a third party server to instruct the camera to take a photograph, wherein the MFD is configured with an extensible interface platform that allows the third party server to communicate with the MFD using a web based service call, wherein the MFD is configured to perform at least two of: a printing function, a scanning function, a copying function, a faxing function, and an electronic transmission of documents function;
sending, via the MFD, a call to the camera to take the photograph, wherein the call is sent to the camera over a universal serial bus (USB) connection between the MFD and the camera, wherein the MFD is configured with a camera web service interface that allows the MFD to communicate with the camera over the USB connection;
receiving, via the MFD, the photograph; and
transmitting, via the MFD, the photograph to the third party server;
receiving, via the MFD, a modified version of the photograph, wherein the photograph is modified by the third party server;
displaying, via the MFD, the modified version of the photograph; and
providing, via the MFD, an option to print the modified version of the photograph, wherein the MFD that sent the call to the camera to take the photograph is the MFD that provides the option to print and prints the photograph.

2. The method of claim 1, further comprising:
receiving an authentication credential from the third party server based upon the photograph.

3. The method of claim 2, wherein the authentication credential is based upon a comparison of the photograph to a database storing photographs of a plurality of users and a respective authentication credential of each one of the plurality of users.

4. The method of claim 1, further comprising:
   detecting the USB connection to the camera;
   notifying the third party server that the camera is available; and
   transmitting to the third party server information associated with the camera.

5. The method of claim 1, wherein the MFD is configured to communicate over an internet protocol address and a port number specified by the third party server for all communications.

6. A non-transitory computer-readable medium having stored thereon a plurality of instructions, which when executed by a processor of a multi-function device (MFD), cause the processor to perform operations for remotely controlling a camera connected to the MFD, the operations comprising:
   receiving a request from a third party server to instruct the camera to take a photograph, wherein the MFD is configured with an extensible interface platform that allows the third party server to communicate with the MFD using a web based service call, wherein the MFD is configured to perform at least two of: a printing function, a scanning function, a copying function, a faxing function and an electronic transmission of documents function;
   sending a call to the camera to take the photograph, wherein the call is sent to the camera over a universal serial bus (USB) connection between the MFD and the camera, wherein the MFD is configured with a camera web service interface that allows the MFD to communicate with the camera over the USB connection;
   receiving the photograph;
   transmitting the photograph to the third party server;
   receiving a modified version of the photograph, wherein the photograph is modified by the third party server;
   displaying the modified version of the photograph; and
   providing an option to print the modified version of the photograph, wherein the MFD that sent the call to the camera to take the photograph is the MFD that provides the option to print and prints the photograph.

7. The non-transitory computer-readable medium of claim 6, further comprising:
   receiving an authentication credential from the third party server based upon the photograph.

8. The non-transitory computer-readable medium of claim 7, wherein the authentication credential is based upon a comparison of the photograph to a database storing photographs of a plurality of users and a respective authentication credential of each one of the plurality of users.

9. The non-transitory computer-readable medium of claim 6, further comprising:
   detecting the USB connection to the camera;
   notifying the third party server that the camera is available; and
   transmitting to the third party server information associated with the camera.

10. The non-transitory computer-readable medium of claim 6, wherein the MFD is configured to communicate over an Internet protocol address and a port number specified by the third party server for all communications.

11. A method for remotely controlling a camera connected to a multi-function device (MFD), the method comprising:
    receiving a web service based call request from a third party server, at the MFD configured with a camera web service interface that allows the MFD to communicate with the camera over the USB connection, and configured with an extensible interface platform that allows the third party server to communicate with the MFD using a web based service call and to instruct the camera to take a photograph, wherein the MFD is configured to perform at least two of: a printing function, a scanning function, a copying function, a faxing function, and an electronic transmission of documents function;
    sending, via the MFD, a call over a universal serial bus (USB) connection to the camera to take the photograph;
    receiving, via the MFD, the photograph;
    transmitting, via the MFD, the photograph to the third party server using a message transmission optimization mechanism (MTOM);
    receiving, via the MFD, a modified version of the photograph, wherein the photograph is modified by the third party server;
    displaying, via the MFD, the modified version of the photograph; and
    providing, via the MFD, an option to print the modified version of the photograph, wherein the MFD that sent the call to the camera to take the photograph is the MFD that provides the option to print and prints the photograph.

12. The method of claim 11, further comprising:
    detecting the USB connection to the camera;
    notifying the third party server that the camera is available; and
    transmitting the third party server information associated with the camera.

\* \* \* \* \*